United States Patent [19]

Arai et al.

[11] Patent Number: 4,930,945
[45] Date of Patent: Jun. 5, 1990

[54] INSERT ROTARY CUTTER

[75] Inventors: Tatsuo Arai, Kitamoto; Takayoshi Saito, Tokyo; Osamu Tsujimura; Hiroaki Hayashizaki, both of Kawasaki, all of Japan

[73] Assignee: Mitsubishi Metal Corporation, Tokyo, Japan

[21] Appl. No.: 352,249

[22] Filed: May 16, 1989

[30] Foreign Application Priority Data

May 20, 1988 [JP] Japan .................................. 63-123356
Jun. 17, 1988 [JP] Japan .................................. 63-149338
Jan. 13, 1989 [JP] Japan .................................. 1-3072[U]

[51] Int. Cl.$^5$ ........................ B26D 1/12; B23P 15/28
[52] U.S. Cl. ........................................ 407/40; 407/42; 407/46; 407/113
[58] Field of Search ................... 407/34, 40, 42, 46, 407/113, 114

[56] References Cited

U.S. PATENT DOCUMENTS 4,297,058 10/1981 Armbrust et al. .................. 407/113
4,645,384 4/1987 Shimomura et al. .............. 407/113

FOREIGN PATENT DOCUMENTS 57-162008 10/1982 Japan .

Primary Examiner—Frederick R. Schmidt
Assistant Examiner—Mark F. Frazier
Attorney, Agent, or Firm—Cushman, Darby & Cushman

[57] ABSTRACT

An insert rotary cutter includes a cutter body having a forward end face and at least one first cutter insert releasably attached to the cutter body. The first cutter insert is of a generally triangular shape including a front face having three marginal ridges and three corner ridges. Each marginal ridge is comprised of first, second and third ridge portions. The insert has three main cutting edges each defined by a respective first ridge portion, three auxiliary cutting edges each defined by a respective third ridge portion, three corner cutting edges each defined by a respective corner ridge, and three relief cutting edges each defined by a respective second ridge portion. One of the corner cutting edges and the main and auxiliary cutting edges which intersect the corner cutting edge are indexed in active cutting position. The indexed main cutting edge extends generally axially from the body while the indexed auxiliary cutting edge extends slightly beyond the forward end face. The relief cutting edge which intersects the indexed auxiliary cutting edge being displaced rearwardly from the indexed auxiliary cutting edge.

18 Claims, 4 Drawing Sheets

FIG. 1 *(PRIOR ART)*
FIG. 2 *(PRIOR ART)*
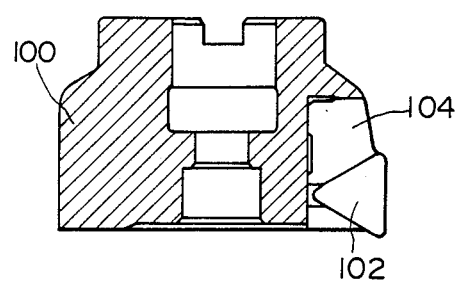
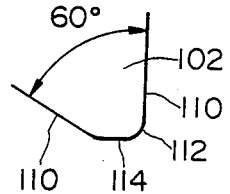
FIG. 3 *(PRIOR ART)*
FIG. 4 *(PRIOR ART)*
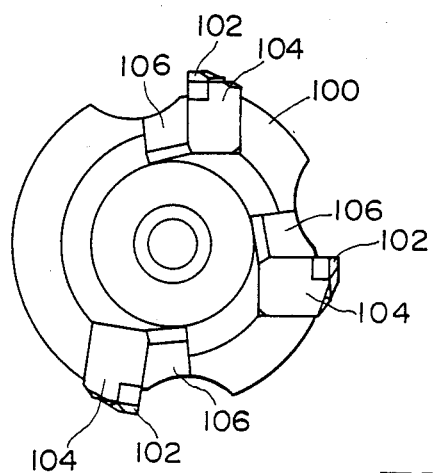
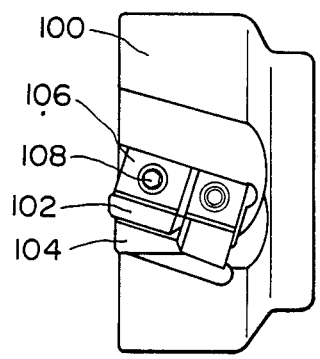
FIG. 5
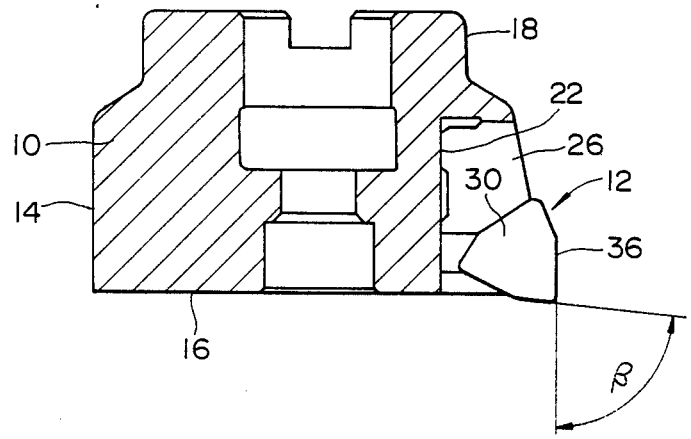

INSERT ROTARY CUTTER

BACKGROUND OF THE INVENTION

1. Field of the Invention

The present invention pertains to an insert rotary cutter for use in shoulder cutting operation, and more particularly to such a cutter having an indexable cutter insert of a generally triangular shape.

2. Prior Art

FIGS. 1 to 4 depict a conventional insert rotary cutter for effecting shoulder cutting operation. The cutter includes a cutter body 100 of a generally circular cross-section and a plurality of indexable cutter inserts 102 of a triangular shape each releasably attached to the cutter body 100. Each insert 102 is received in a support member 104 and secured thereto through a wedge 106 fixed to the cutter body 100 by a clamp screw 108.

As seen best in FIG. 2, the triangular cutter insert 102 includes three indexable sets of main, corner, and auxiliary cutting edges 110, 112 and 114, and hence is economical as compared with parallelogramic or rhombic cutter inserts. However, since the apex angle of the insert 102 is 60° as depicted in FIG. 2, strength of the portion adjacent to the auxiliary cutting edge 114 is relatively small, so that the portion is susceptible to chipping. In addition, a wiper insert should preferably be employed to improve the surface finish of the machined product. However, a conventional wiper insert has a shape such as parallelogram and hence is quite different from the above triangular insert. For this reason, when replacing the above usual insert with a wiper insert, the support member 104 must also be replaced with a different one. Thus, a shoulder cutter with a wiper insert has not hitherto been put to practical use.

SUMMARY OF THE INVENTION

It is therefore an object of the present invention to provide an insert rotary cutter in which the cutter insert has an increased strength so as to be less susceptible to chipping, and in which the wiper insert can easily be mounted to ensure a superior surface finish of the machined product.

Another object of the invention is to provide an indexable cutter insert which is especially adapted for use in a shoulder cutting tool.

According to a first aspect of the present invention, there is provided an insert rotary cutter comprising a cutter body having an axis of rotation therethrough and having a forward end face; and at least one first cutter insert releasably attached to the cutter body, the first cutter insert being of a generally triangular shape including a front face having three marginal ridges and three corner ridges where adjacent marginal ridges intersect each other, each marginal ridge being comprised of first, second, and third ridge portions disposed so that the second ridge portion is interposed between the first and third ridge portions, the first insert having three main cutting edges each defined by a respective first ridge portion, three auxiliary cutting edges each defined by a respective third ridge portion, three corner cutting edges each defined by a respective corner ridge, and three relief cutting edges each defined by a respective second ridge portion; one of the corner cutting edges and the main and auxiliary cutting edges which intersect the corner cutting edge being indexed in active cutting positions, in such a manner that the indexed main cutting edge extends generally axially from the body while the indexed auxiliary cutting edge extends slightly beyond the forward end face, the relief cutting edge which intersects the indexed auxiliary cutting edge being displaced rearwardly from the indexed auxiliary cutting edge.

According to a second aspect of the present invention, there is provided an indexable cutter insert having a generally triangular shape including a front face having three marginal ridges and three corner ridges where adjacent marginal ridges intersect each other, each marginal ridge being comprised of first, second, and third ridge portions disposed so that the second ridge portion is interposed between the first and third ridge portions, the insert having three main cutting edges each defined by a respective first ridge portion, three auxiliary cutting edges each defined by a respective third ridge portion, three corner cutting edges each defined by a respective corner ridge, and three relief cutting edges each defined by a respective second ridge portion.

BRIEF DESCRIPTION OF THE DRAWINGS

FIG. 1 is a cross-sectional view of a conventional insert rotary cutter for shoulder cutting;

FIG. 2 is an enlarged view of a cutter insert used in the cutter of FIG. 1;

FIG. 3 is an end view of the cutter of FIG. 1;

FIG. 4 is a side elevational view of the cutter of FIG. 1;

FIG. 5 is a cross-sectional view of an insert rotary cutter in accordance with the present invention;

DESCRIPTION OF PREFERRED EMBODIMENTS OF THE INVENTION

Various embodiments of the present invention will now be described with reference to the drawings, in which the same numerals are used to denote the same or similar parts through several different views.

Figure 6:
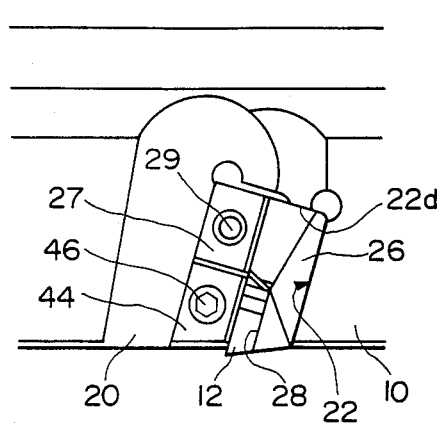
FIG. 6 is a partial side elevational view of the cutter of FIG. 5.
Figure 7:
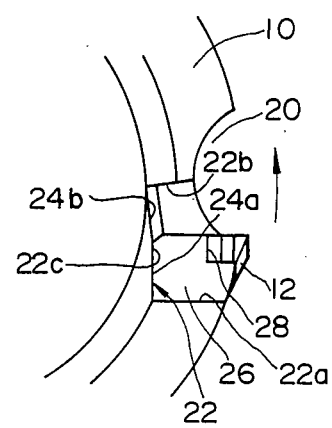
FIG. 7 is a partial end view of the cutter of FIG. 5.
Figure 8:
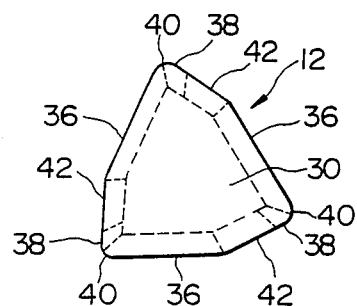
FIG. 8 is a plan view of a first cutter insert employed in the cutter of FIG. 5
Figure 9:
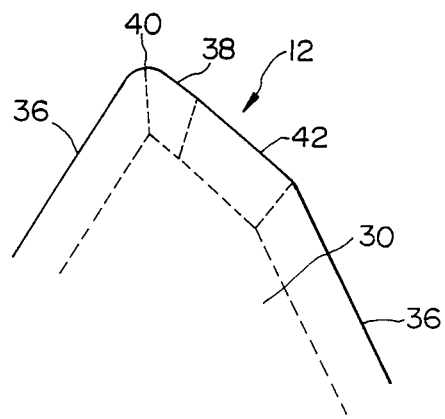
FIG. 9 is a cross-sectional view of the first insert.
Figure 10:
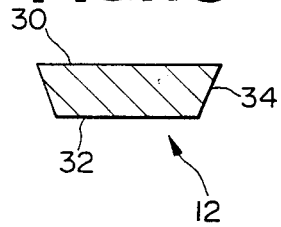
FIG. 10 is an enlarged plan view of a portion of the first insert.

FIGS. 5 to 7 depict an insert rotary cutter in accordance with an embodiment of the invention. The cutter comprises a cutter body 10 of a circular cross-section having an axis of rotation therethrough and a plurality of indexable first cutter inserts 12 releasably attached thereto. The cutter body 10 includes a circumferential surface 14 and a forward end face 16 disposed in a plane perpendicular to the axis of rotation. The cutter body 10 also includes a boss 18 formed at the rearward end thereof so that it can be secured to a spindle of a milling machine.

The cutter body 10 has a plurality of pockets 20 arranged in circumferentially spaced relation to each other and formed so as to open radially outwardly and forwardly from the body. Each of the pockets 20 has a depression 22 of a generally channel-shaped cross-section defined by a pair of circumferentially-facing opposed first and second side walls 22a and 22b and a bottom wall 22c interconnecting the first and second side walls 22a and 22b at their inner ends, the depression 22 extending rearwardly from the forward end face 16. The bottom wall 22c of the depression 20 defines a first bottom wall face 24a disposed generally perpendicular to the first side wall 22a adjacent thereto and a second bottom wall face 24b disposed adjacent to the first bottom wall face 24a. The depression 22 also has a rearward wall 22d interconnecting the first and second side walls 22a and 22b and the bottom wall 22c. Each of the depressions 22 receives a respective cutter insert 12 through a respective support member 26 of a hexahedral shape interposed therebetween.

Each support member 26 includes a recess formed in a front face thereof and having a portion of a generally triangular shape on its bottom which serves as an insert receiving seat 28. Each support member 26 is received in a respective depression 22 with one longer side face, a rear face, and one shorter side face being held in contact with the first bottom wall face 24a, the first side wall 22a, and the rearward wall 22d, respectively, in such a manner that the insert receiving seat 28 faces in the direction of rotation of the cutter body 10. Then, the support member 26 is replaceably held in position by a clamp wedge 27 which is received in the depression 22 and secured thereto through a screw 29 threaded thereinto.

The first cutter insert 12, as shown in greater detail in FIGS. 8 to 11, comprises a generally triangular plate of uniform thickness defined by a flat front face 30, a flat rear face 32 disposed parallel to the front face 30, and three side faces S4 The front face 30 has three marginal ridges and three corner ridges where adjacent marginal ridges intersect each other, and each marginal ridge is comprised of first, second and third ridge portions disposed so that the second ridge portion is interposed between the first and third ridge portions. The insert 12 has three main cutting edges 36 each defined by a respective first ridge portion, three auxiliary cutting edges 38 each defined by a respective third ridge portion, three corner cutting edges 40 each defined by a respective corner ridge, and three relief cutting edges 42 or second auxiliary cutting edges each defined by a respective second ridge portion. Each of the side faces serving as a relief surface for the above cutting edges slopes inwardly in a direction away from the front face 30.

Each of the inserts 12 is received on the insert receiving seat 28 of a respective support member 26, in such a manner that one of the corner cutting edges 40 and the main and auxiliary cutting edges 36 and 38 which intersect the corner cutting edge 40 are indexed in active cutting position. More specifically, the main cutting edge 36 is indexed in a peripheral cutting position so as to extend generally axially from the body while the auxiliary cutting edge 38 is indexed in an end cutting position so as to be disposed in a plane generally perpendicular to the axis of rotation of the body 10. Then, the insert 12 is releasably held in position by a clamp wedge 44 which is received in the depression 22 and secured thereto through a screw 46 threaded thereinto.

Figure 11:
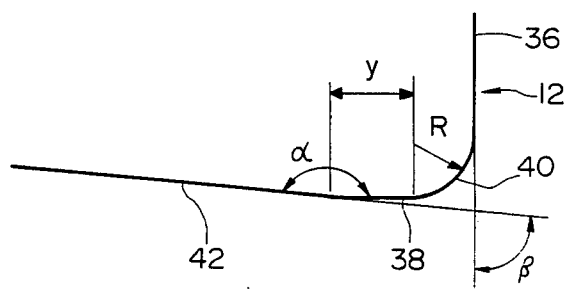
FIG. 11 is a further enlarged view of the first cutter insert.

As seen best in FIG. 11, the main, auxiliary and relief cutting edges 36, 38 and 42 are formed to be straight, but the corner cutting edge 40 is formed to be arcuately shaped such that its radius of curvature R is, for example, 1 mm. The auxiliary cutting edge may be, however, formed to be slightly arcuate such that its radius of curvature is for example 500 mm. Furthermore, the relief cutting edge 42 which extends from the indexed auxiliary cutting edge 38 is formed to be inclined at a prescribed obtuse angle $\alpha$ radially inwardly and rearwardly from the body 10 with respect to the indexed auxiliary cutting edge 38. The angle $\alpha$ is selected to be in a range from 155° to 179°, more preferably from 170° to 177°. In addition, although the angle defined by the main cutting edge 36 and the auxiliary cutting edge 38 is set to be somewhat less than a right angle, the insert 12 is arranged so that when viewed in a circumferential direction of the body, the indexed main cutting edge 36 and the indexed auxiliary cutting edge 38 define a right angle. Thus, the indexed main cutting edge 36 and the inclined relief cutting edge 42 define an angle $\beta$ ranging from 65° to 89°, more preferably from 80° to 87°. If the above angle $\alpha$ exceeds the above range, the length y of the indexed auxiliary cutting edge 38 unduly increases when the indexed auxiliary cutting edge 38 is subjected to wear, so that the cutting load increases and the surface finish of the machined product deteriorates. On the other hand, if the angle $\alpha$ is less than the above range, that portion of the insert adjacent to the indexed cutting edges becomes excessively sharp as a whole, thereby reducing the strength of the cutter insert.

In the cutter as described above, since the angle $\alpha$ between the indexed auxiliary cutting edge 38 and the relief cutting edge 42 which intersects the indexed auxiliary cutting edge 38 ranges from 155° to 179°, the length y of the auxiliary cutting edge 38 can be limited to a prescribed value, e.g., 1 mm to 2.5 mm, and the length is maintained at a small value even when the indexed auxiliary cutting edge 38 is subjected to wear. Therefore, although the number of the inserts 12 is usually great, total cutting resistance can be kept small, so that an excellent surface finish of the machined product can be achieved. Furthermore, due to the provision of the relief cutting edge 42, the angle $\beta$ can be made wide, so that the strength of the cutter insert can be enhanced.

Figure 12:
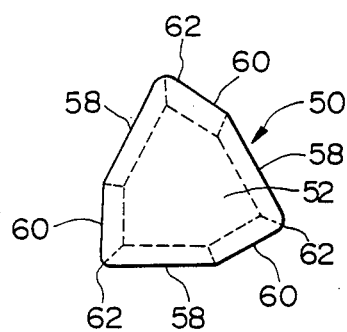
FIG. 12 is a plan view of a second cutter insert employed in a modified cutter in accordance with the present invention.
Figures 13, 14:
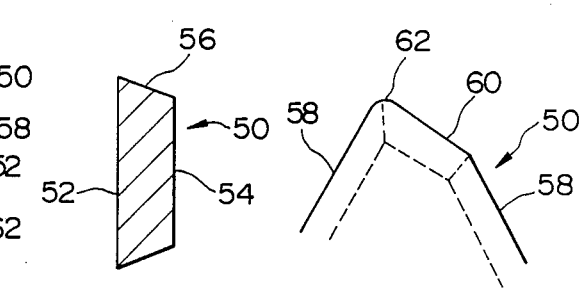
FIG. 13 is a cross-sectional view of the second insert.
FIG. 14 is an enlarged plan view of a portion of the second insert.

In the foregoing, one or two first cutter inserts 12 may be replaced by wiper cutter inserts 50 as shown in FIGS. 12 to 14. The number of the wiper inserts should not be increased in order to prevent the increase of the cutting resistance. The wiper insert 50 is basically similar in structure to the first insert 12, and hence comprises a generally triangular plate of a uniform thickness defined by a flat front face 52, a flat rear face 54 disposed parallel to the front face 52, and three side faces 56. The front face 52 has three marginal ridges and three corner ridges where adjacent marginal ridges intersect each other. In the wiper insert 50, however, each marginal ridge is comprised only of first and second ridge portions. Thus, the insert has three straight main cutting edges 58 defined by a respective first ridge portion, three auxiliary or wiper cutting edges 60 each defined by a respective second ridge portion, and three corner cutting edges 62 each defined by a respective corner ridge. The main and wiper cutting edges 58 and 60 are formed to be straight while the corner cutting edge 62 is formed to be arcuately shaped such that its radius of curvature is, for example, 1 mm. The wiper cutting edge 60 may be, however, formed to be slightly arcuate such that its radius of curvature is for example 500 mm.

Figure 15:
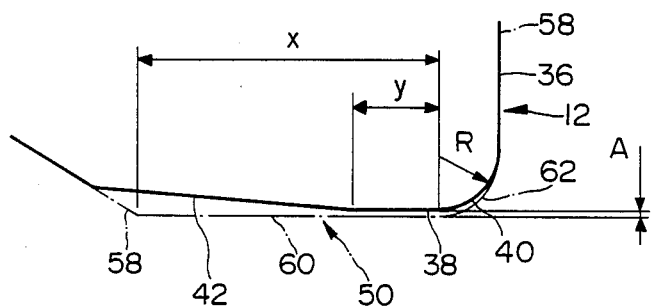
FIG. 15 is an enlarged plan view showing the first and second cutter inserts.

The wiper insert 50 is also received on the insert receiving seat 28 of one of the above-mentioned support members 26, in such a manner that one of the corner cutting edges 62 and the main and wiper cutting edges 58 and 60 which intersect the corner cutting edge 62 are indexed in active cutting position. The main cutting edge 58 is indexed in a peripheral cutting position so as to extend generally axially from the body 10 while the wiper cutting edge 60 is indexed in an end cutting position so as to be disposed in a plane generally perpendicular to the axis of rotation of the body 10. As shown in FIG. 15, the wiper insert 50 is formed so that the length x of the indexed wiper cutting edge 60 of the wiper insert 50 is greater than the indexed auxiliary cutting edge 38 of the first insert 12, and is dimensioned somewhat larger than the first insert 12 to such a extent that the indexed wiper cutting edge of the wiper insert is spaced forwardly from the body 10 a distance A from the indexed auxiliary cutting edge of the first insert. The length x of the wiper cutting edge 38 is formed to be for example no less than 5 mm, while the distance A is selected to range from 0.03 mm to 0.1 mm.

In the cutter having the first and wiper inserts 12 and 50 as described above, the wiper insert 50 cooperates with the first insert 12 to cut a metal workpiece, so that the surface finish can be further improved. In addition, inasmuch as the first and wiper inserts 12 and 50 are of generally the same construction, each insert can be replaced by the other depending upon the use of the cutter.

Figure 16:
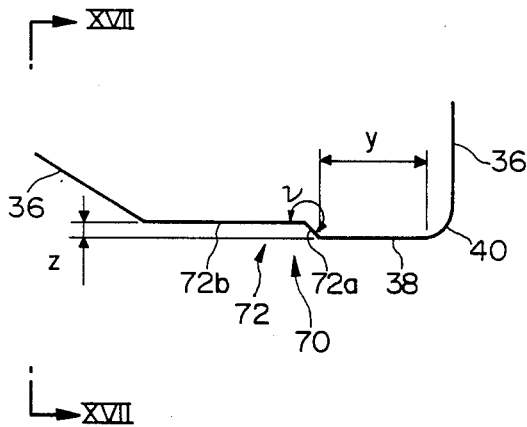
FIG. 16 is an enlarged plan view showing a portion of a modified first cutter insert in accordance with the present invention.
Figure 17:
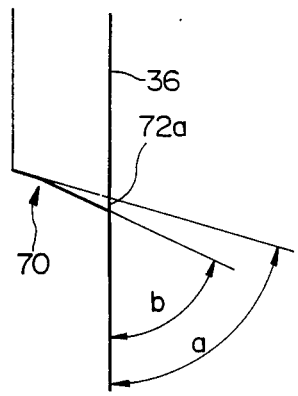
FIG. 17 is a side elevational view as seen in the direction designated by the arrows XVII—XVII in FIG. 16.

FIGS. 16 and 17 depict a modified first cutter insert 70 which has a relief cutting edge 72 which is comprised of a first edge portion 72a intersecting a respective auxiliary cutting edge 38 and a second edge portion 72b intersecting a respective main cutting edge 36. The first edge portion 72a slopes inwardly from the insert away from the respective auxiliary cutting edge 38 while the second edge portion 72b extends generally parallel to the auxiliary cutting edge 38 which the above-mentioned relief cutting edge 72 intersects. The first and second edge portions 72a and 72b of the relief cutting edge 72 define an angle γ of 190° to 225° therebetween. Furthermore, the second edge portion 72b of the relief cutting edge 72 which intersects the indexed auxiliary cutting edge 38 is spaced a prescribed distance z from the indexed auxiliary cutting edge 38. The distance z ranges from 0.05 mm to 0.5 mm, more preferably from 0.1 mm to 0.3 mm. Furthermore, as shown in FIG. 17, the second edge portion 72b of the relief cutting edge 72 which intersects the indexed auxiliary cutting edge 38 is provided with a relief angle a greater than a relief angle b for the indexed auxiliary cutting edge 38.

Figure 18:
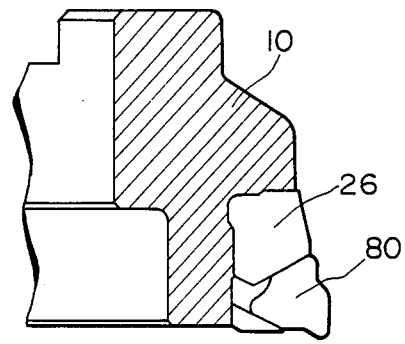
FIG. 18 is a cross-sectional view showing another modified insert rotary cutter in accordance with the present invention.
Figure 19:
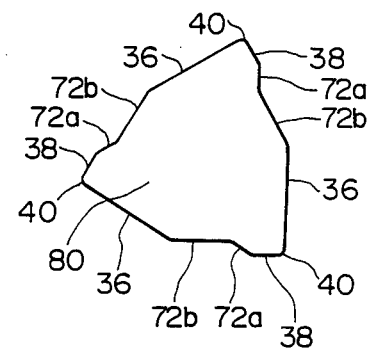
FIG. 19 is a plan view showing a cutter insert employed in the cutter of FIG. 18.
Figure 20:
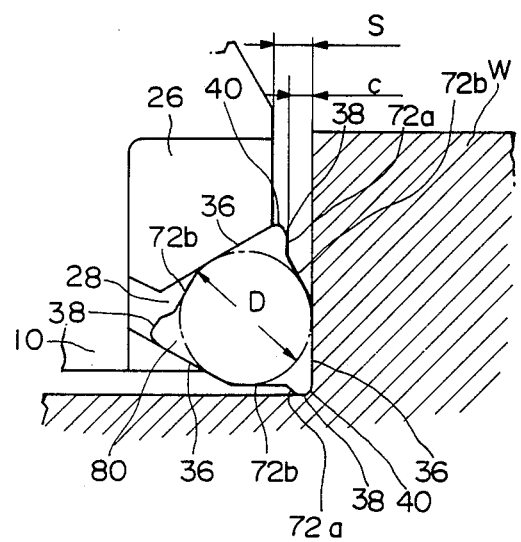
FIG. 20 is a view showing the state in which the cutting operation is being effected by the cutter of FIG. 18.

FIGS. 18 to 20 depict a further modified cutter in accordance with the present invention which employs a first insert 80 of generally the same structure as the insert shown in FIGS. 16 and 17. In this embodiment, however, the first edge portion 72a of the relief cutting edge 72 which intersects the indexed main cutting edge 36 is formed to be spaced radially inward with respect to the body 10 from the indexed main cutting edge 36 a prescribed distance c which satisfies the following relationship:

$$D/8 \leqq c \leqq D/6$$

where D is the diameter of the largest circle that can be inscribed within the first insert 80. Furthermore, the first edge portion 72a of the relief cutting edge 72 is formed parallel to the main cutting edge 36 which intersects the same relief cutting edge 72. With this construction, greater distance c can be achieved between the first edge portion 72a of the relief cutting edge 72 and the workpiece W. Therefore, chips produced during cutting operation pass through the spacing between the relief cutting edge 72 and the workpiece W, and are smoothly removed to the surface of the workpiece by passing the space S between the body 10 and the workpiece W, so that the jamming of chips can be prevented and cutting efficiency can be substantially improved. In the foregoing, if the distance c is below D/8, the spacing between the relief cutting edge and the workpiece W is excessively reduced, and therefore chip removal is impaired. On the other hand, if the distance exceeds D/6, the portion of the insert which is received on the insert receiving seat 28 of the support member 26 is reduced unduly, so that a secure holding of the insert on the support member is prevented.

Obviously many modifications and variations of the present invention are possible in the light of the above teachings. It is therefore to be understood that within the scope of the appended claims, the invention may be practiced other than as specifically described.

What is claimed is:

1. An insert rotary shoulder cutter comprising:
  (a) a cutter body having an axis of rotation therethrough and having a forward end face; and
  (b) at least one first cutter insert releasably attached to said cutter body, said first cutter insert being of a generally triangular shape including a front face having three marginal ridges and three corner ridges where adjacent marginal ridges intersect each other, each marginal ridge being comprised of first, second and third ridge portions disposed so that the second ridge portion is interposed between the first and third ridge portions, said first insert having three main cutting edges each defined by a respective first ridge portion, three auxiliary cutting edges each defined by a respective third ridge portion, three corner cutting edges each defined by a respective corner ridge, and three relief cutting edges each defined by a respective second ridge portion;
    one of said corner cutting edges and the main and auxiliary cutting edges which intersect said one corner cutting edge being indexed in active cutting position, in such a manner that said indexed main cutting edge extends generally axially from said body while said indexed auxiliary cutting edge extends slightly beyond said forward end face, the relief cutting edge which intersects said indexed auxiliary cutting edge being displaced rearwardly with respect to said body from said indexed auxiliary cutting edge.

2. An insert rotary cutter as defined in claim 1, wherein said main, auxiliary and relief cutting edges are generally straight, the relief cutting edge which extends from said indexed auxiliary cutting edge being inclined inwardly and rearwardly from the body with respect to said indexed auxiliary cutting edge so as to define an angle ranging from 155° to 179° therebetween.

3. An insert rotary cutter as defined in claim 2, wherein said indexed auxiliary cutting edge and said indexed main cutting edge define a right angle as viewed in a circumferential direction of said body, whereby said indexed main cutting edge and said indexed relief cutting edge define an angle ranging from 65° to 89° therebetween.

4. An insert rotary cutter as defined in claim 3, wherein said angle between said indexed auxiliary cutting edge and the relief cutting edge which intersects said indexed auxiliary cutting edge ranges from 170° to 177°.

5. An insert rotary cutter as defined in claim 2, wherein each auxiliary cutting edge is of a slightly arcuate shape.

6. An insert rotary cutter as defined in claim 1, wherein there are a plurality of said first inserts and further comprising at least one wiper insert replacing some of said first cutter inserts.

7. An insert rotary cutter as defined in claim 6, wherein said wiper insert includes a front face having three marginal ridges and three corner ridges where adjacent marginal ridges intersect each other, each marginal ridge of said wiper insert being comprised of first and second ridge portions, said wiper insert having three main cutting edges each defined by a respective first ridge portion, three wiper cutting edges each defined by a respective second ridge portion, and three corner cutting edges each defined by a respective corner ridge, one of said corner cutting edges of said wiper insert and the main and wiper cutting edges which intersect said one corner cutting edge being indexed in active cutting position, in such a manner that said indexed main cutting edge extends generally axially from said body while said indexed wiper cutting edge extends slightly beyond said forward end face.

8. An insert rotary cutter comprising:
(a) a cutter body having an axis of rotation therethrough and having a forward end face; and
(b) at least one first cutter insert releasably attached to said cutter body, said first cutter insert being of a generally triangular shape including a front face having three marginal ridges and three corner ridges where adjacent marginal ridges intersect each other, each marginal ridge being comprised of first, second and third ridge portions disposed so that the second ridge portion is interposed between the first and third ridge portions, said first insert having three main cutting edges each defined by a respective first ridge portion, three auxiliary cutting edges each defined by a respective third ridge portion, three corner cutting edges each defined by a respective corner ridge, and three relief cutting edges each defined by a respective second ridge portion;
one of said corner cutting edges and the main and auxiliary cutting edges which intersect said one corner cutting edge being indexed in active cutting position, in such a manner that said indexed main cutting edge extends generally axially from said body while said indexed auxiliary cutting edge extends slightly beyond said forward end face, the relief cutting edge which intersects said indexed auxiliary cutting edge being displaced rearwardly with respect to said body from said indexed auxiliary cutting edge;
each relief cutting edge being comprised of a first edge portion intersecting a respective auxiliary cutting edge and a second edge portion intersecting a respective main cutting edge, said first edge portion sloping inwardly from the insert away from said respective auxiliary cutting edge while said second edge portion extends generally parallel to the auxiliary cutting edge which said each relief cutting edge intersects.

9. An insert rotary cutter as defined in claim 8, wherein the first edge portion of the relief cutting edge which intersects said indexed main cutting edge is spaced radially inwardly with respect to said body from said indexed main cutting edge a distance c which satisfies the following relationship:

$$D/8 \leq c \leq D/6$$

where D is the diameter of the largest circle which may be inscribed within said first insert.

10. An insert rotary cutter as defined in claim 8, wherein said first and second edge portions of each relief cutting edge define an angle of 190° to 225° therebetween.

11. An insert rotary cutter as defined in claim 10, wherein said second edge portion of the relief cutting edge which intersects said indexed auxiliary cutting edge is spaced axially on said body 0.05 mm to 0.5 mm from said indexed auxiliary cutting edge.

12. An insert rotary cutter as defined in claim 11, wherein the axial distance between said second edge portion of the relief cutting edge which intersects said indexed auxiliary cutting edge and said indexed auxiliary cutting edge ranges from 0.1 mm to 0.3 mm.

13. An insert rotary cutter as defined in claim 11, wherein the second edge portion of the relief cutting edge which intersects said indexed auxiliary cutting edge is provided with a relief angle greater than a relief angle for said indexed auxiliary cutting edge.

14. An insert rotary cutter further comprising:
(a) a cutter body having an axis of rotation therethrough and having a forward end face; and
(b) a plurality of first cutter inserts releasably attached to said cutter body, each said first cutter insert being of a generally triangular shape including a front face having three marginal ridges and three corner ridges where adjacent marginal ridges intersect each other, each marginal ridge being comprised of first, second and third ridge portions disposed so that the second ridge portion is interposed between the first and third ridge portions, said first insert having three main cutting edges each defined by a respective first ridge portion, three auxiliary cutting edges each defined by a respective third ridge portion, three corner cutting edges each defined by a respective corner ridge, and three relief cutting edges each defined by a respective second ridge portion;
one of said corner cutting edges and the main and auxiliary cutting edges which intersect said one corner cutting edge being indexed in active cutting position, in such a manner that said indexed main cutting edge extends generally axially from said body while said indexed auxiliary cutting edge extends slightly beyond said forward end face, the relief cutting edge which intersects said indexed auxiliary cutting edge being displaced rearwardly with respect to said body from said indexed auxiliary cutting edge;

at least one wiper insert replacing some of said first cutter inserts said wiper insert including a front face having three marginal ridges and three corner ridges where adjacent marginal ridges intersect each other, each marginal ridge of said wiper insert being comprised of first and second ridge portions, said wiper insert having three main cutter edges each defined by a respective first ridge portion, three wiper cutting edges each defined by a respective second ridge portion, and three corner cutting edges each defined by a respective corner ridge, one of said corner cutting edges of said wiper insert and the main and wiper cutting edges which intersect said one corner cutting edge being indexed in active cutting portion, in such a manner that said indexed main cutting edge extends generally axially from said body while said indexed wiper cutting edge extends slightly beyond said forward end face; and a plurality of support members of an identical shape and size, said first and wiper inserts being received by respective said support members, said first and wiper inserts being dimensioned such that the indexed wiper cutting edge of said wiper insert is longer than the indexed auxiliary cutting edge of said first insert and is spaced forwardly from said body a distance therefrom.

15. An insert rotary cutter as defined in claim 14, wherein said distance between the indexed wiper cutting edge of said wiper insert and the indexed auxiliary cutting edge of said first insert ranges from 0.03 mm to 0.1 mm.

16. An indexable cutter insert for an insert rotary shoulder cutter having a generally triangular shape including a front face having marginal ridges and three corner ridges where adjacent marginal ridges intersect each other, each marginal ridge being comprised of first, second and third ridge portions disposed so that the second ridge portion is interposed between the first and third ridge portions, said insert having three main cutting edges each defined by a respective first ridge portion, three auxiliary cutting edges each defined by a respective third ridge portion, three corner cutting edges each defined by a respective corner ridge, and three relief cutting edges each defined by a respective second ridge portion, each main cutting edge being greater in length than each relief cutting edge, each corner cutting edge and the main and auxiliary cutting edges which intersect said corner cutting edge being adapted to be indexed in such an active cutting position that the indexed main cutting edge serves as a shoulder cutting edge while the indexed auxiliary cutting edge serves as an end cutting edge.

17. An indexable cutter insert as defined in claim 16, wherein said main, auxiliary, and relief cutting edges are generally straight, each relief cutting edge which extends from a respective auxiliary cutting edge being inclined with respect to said auxiliary cutting edge so as to define an obtuse angle therebetween.

18. An indexable cutter insert for an insert rotary cutter having a generally triangular shape including a front face having three marginal ridges and three corner ridges where adjacent marginal ridges intersect each other, each marginal ridge being comprised of first, second and third ridge portions disposed so that the second ridge portion is interposed between the first and third ridge portions, said insert having three main cutting edges each defined by a respective first ridge portion, three auxiliary cutting edges each defined by a respective third ridge portion, three corner cutting edges each defined by a respective corner ridge, and three relied cutting edges each defined by a respective second ridge portion;

each relief cutting edge being comprised of a first edge portion intersecting a respective auxiliary cutting edge and a second edge portion intersecting a respective main cutting edge, said first edge portion sloping inwardly from the insert away from said respective auxiliary cutting edge so as to define an obtuse angle therebetween while said second edge portion extends generally parallel to the auxiliary cutting edge which said each relief cutting edge intersects.

* * * * *